(12) United States Patent
Kim (10) Patent No.: US 7,909,258 B2
(45) Date of Patent: Mar. 22, 2011

(54) RFID CARD USING KOREA PAPER AND THE MANUFACTURING METHOD THEREOF

(75) Inventor: Won-Ki Kim, Busan (KR)

(73) Assignee: KBCTECH Co., Ltd. (KR)

( * ) Notice: Subject to any disclaimer, the term of this patent is extended or adjusted under 35 U.S.C. 154(b) by 263 days.

(21) Appl. No.: 12/306,801

(22) PCT Filed: Jun. 28, 2007

(86) PCT No.: PCT/KR2007/003138
§ 371 (c)(1),
(2), (4) Date: Dec. 29, 2008

(87) PCT Pub. No.: WO2008/002083
PCT Pub. Date: Jan. 3, 2008

(65) Prior Publication Data
US 2009/0242647 A1    Oct. 1, 2009

(30) Foreign Application Priority Data
Jun. 30, 2006   (KR) .................. 10-2006-0060964

(51) Int. Cl.
*G06K 19/06* (2006.01)
(52) U.S. Cl. ........................................ 235/492
(58) Field of Classification Search ............ 235/492, 235/491
See application file for complete search history.

(56) References Cited

FOREIGN PATENT DOCUMENTS
| | | |
|---|---|---|
| JP | 11-150133 | 6/1999 |
| JP | 2000-315-697 | 11/2000 |
| KR | 10-2005-0079621 | 8/2005 |

*Primary Examiner* — Michael G Lee
*Assistant Examiner* — Kristy A Haupt
(74) *Attorney, Agent, or Firm* — Park & Associates IP Law, P.C.

(57) ABSTRACT

The present invention provides an RFID card using Korean paper and a method of manufacturing the same. The RFID card has a base sheet provided with a chip accommodation portion in which an RFID chip is accommodated, protective sheets stacked on top and bottom surfaces of the base sheet, and transparent film sheets stacked on outside surfaces of the protective sheets and provided with advertisements. The base sheet is made of strawboard that is manufactured by breaking the bark of a paper mulberry tree and straw into pieces and mixing them together. The protective sheet is made of oiled floor paper that is manufactured by coating Korean paper with perilla oil. The transparent film sheets are made of Chinese drawing paper that is manufactured using paper mulberry as raw material. The loop antenna is printed on the strawboard in conductive ink, and is connected to the RFID chip.

3 Claims, 7 Drawing Sheets

RFID CARD USING KOREA PAPER AND THE MANUFACTURING METHOD THEREOF

TECHNICAL FIELD

The present invention relates, in general, to a radio frequency identification card (hereinafter referred to as an 'RFID card') using Korean paper and a method of manufacturing the RFID card, and, more particularly, to an RFID card using Korean paper and a method of manufacturing the RFID card, in which the RFID card is manufactured using fibrous paper, such as Korean paper, so that the RFID card can be made to be environmentally friendly through the prevention of the discharge of environmental contaminants when the lifetime of the RFID card expires and the RFID card is consequently discarded through incineration, and, at the same time, the manufacturing cost thereof can be considerably reduced.

BACKGROUND ART

Generally, RFID cards function to wirelessly send and receive product information via frequencies, are already included in subway and bus cards and widely used in daily life, and are also called smart tags or smart labels.

Such RFID cards are advantageous over barcode systems, which carry information on strip images, in that they can wirelessly process information rapidly, and the technology thereof has advanced at present to the level where product information can be wirelessly and immediately read within predetermined distances.

Such RFID cards do not require users to stop and wait for the processing of the information of the RFID cards because card terminals process the information in a time period shorter than 100 ms (0.1 seconds) when card holders pass the RFID cards over the antenna boxes of the terminals within recognition distances. Furthermore, such RFID cards can be manufactured to have sizes equal to or smaller than those of existing credit cards, so that the reading of the RFID cards is enabled while the RFID cards are put in purses or carried as accessories, thereby providing convenience to users. The illicit use of the RFID cards can be prevented by encrypting data, and fixed serial numbers are contained in respective RFID cards, so that the uniqueness and security of the RFID cards is high, and thus the RFID cards have excellent functionality, including convenience of use, thereby providing convenience to card holders.

Such RFID cards are international standard ISO cards, and are classified into a plurality of types.

That is, ISO 14443A-type cards, ISO 14443B-type cards and ISO 15693-type cards are based on the international standards of RFID cards for 13.56 MHz. Each 13.56 MHz tag includes an RFID chip capable of storing information and a loop antenna, that is, a coil surrounding the RFID chip. When the RFID chip is brought within the range of recognition of the terminal, an inductive magnetic field is generated from the loop antenna, that is, a coil, so that data stored by a program stored in the RFID chip is sent to the terminal.

With regard to the 13.56 MHz tag, the distance of recognition between the terminal and the tag varies depending on the construction of the loop antenna, and it is chiefly used in traffic cards because the distance of recognition from the terminal is short.

Furthermore, ISO 18000-type cards are based on the international standards of RFID cards for 900 MHz. Each of the 900 MHz tags includes an RFID chip, capable of storing data in memory, and a UHF antenna, capable of receiving a carrier from a terminal. When the 900 MHz tag receives a carrier from the terminal, the RFID chip contained in the tag reacts thereto and thus sends the content of the memory to the terminal.

Such 900 MHz tags are chiefly used for logistics management, personnel and vehicle entry control, and attendance management due to their long distances of recognition from terminals.

Meanwhile, ISO 11784-type cards are based on the international standards of RFID cards for 134 KHz, and are used for the management of animals. ISO 7816 cards are based on the international standards of RFID cards for smart cards, are electronic cards onto the surfaces of which Integrated Circuit (IC) RFID chips, each containing a 8-bit or 32-bit Micro Processor Unit (MPU) having its own operation function, a Crypto Operating System (COS) and EEPROM, that is, a secure storage space, are attached, and are mainly used as electronic money or the like in the financial field.

Figure 1:
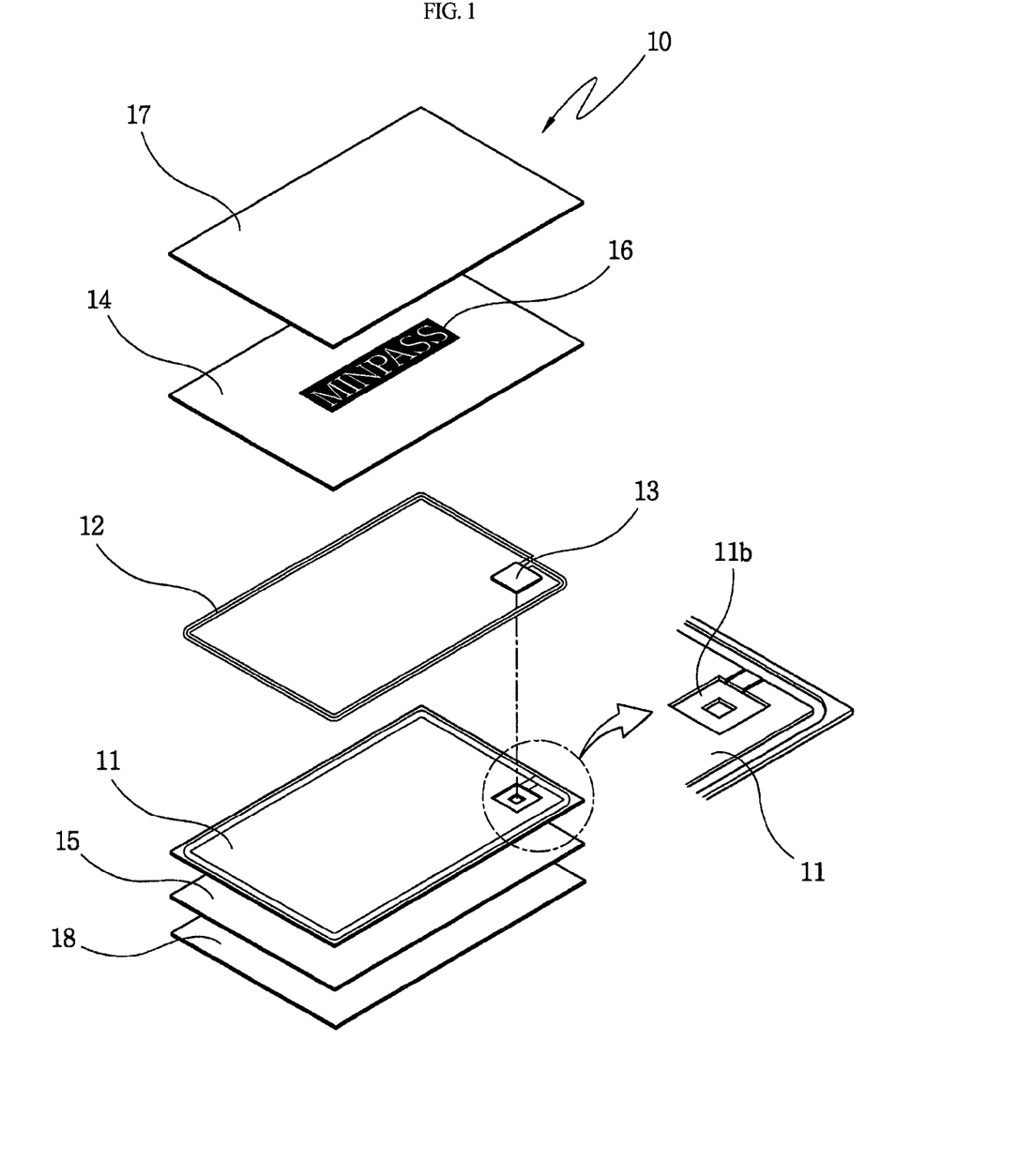
FIG. 1 is an exploded perspective view of a typical RFID card.

FIG. 1 is a diagram showing the construction of an RFID card including a typical RFID tag. In the RFID card, a loop antenna 12, formed by arranging several turns of thin copper line or printing such a conductive line in conductive ink, is disposed along the peripheral portion of the upper surface of a base sheet 11, and the RFID chip 13, connected to the loop antenna 12 and configured to store various types of information and communicate with a terminal, is installed on one side of the upper surface of the base sheet 11.

Protective sheets 14 and 15, provided with a function of protecting the loop antenna 12 and the RFID chip 13 on the base sheet 11 and provided with printed advertisements, are respectively disposed on and beneath the base sheet 11, and transparent film sheets 17 and 18, configured to protect advertisements 16 printed on the surfaces of the protective sheets 14 and 15, are respectively stacked on the outer surfaces of the protective sheets 14 and 15.

The conventional RFID card 10, constructed as described above, is configured such that, when a user brings the RFID card 10 near a terminal (not shown), a high-frequency band frequency in a high frequency band, transmitted from the terminal, is induced to the loop antenna 12, and thus an electromotive force is generated, so that the electromotive force is supplied to the RFID chip 13 as drive power.

When drive power is supplied to the RFID chip 13 via the loop antenna 12, various types of information are sent to the terminal via the loop antenna 12 by the program, and then information is processed, so that the RFID chip 13 and the terminal perform bidirectional communication via the loop antenna 12.

Most such conventional RFID cards are incinerated in the case where they cannot be used because the RFID chips 13 or the loop antennas 12 are damaged or in the case where they are discarded because the life spans thereof have expired. In this case, there is a problem in that environmental hormones, toxic to human bodies, are discharged from the base sheet 11, the protective sheets 14 and 15, and the transparent film sheets 17 and 18, made of polyvinyl chloride (PVC), thereby causing air contamination.

In order to solve the conventional problem, a paper-type RFID tag is proposed in Korean Unexamined Patent No. 2005-79621. The paper-type RFID tag is illustrated in FIGS. 2 and 3.

Figure 2:
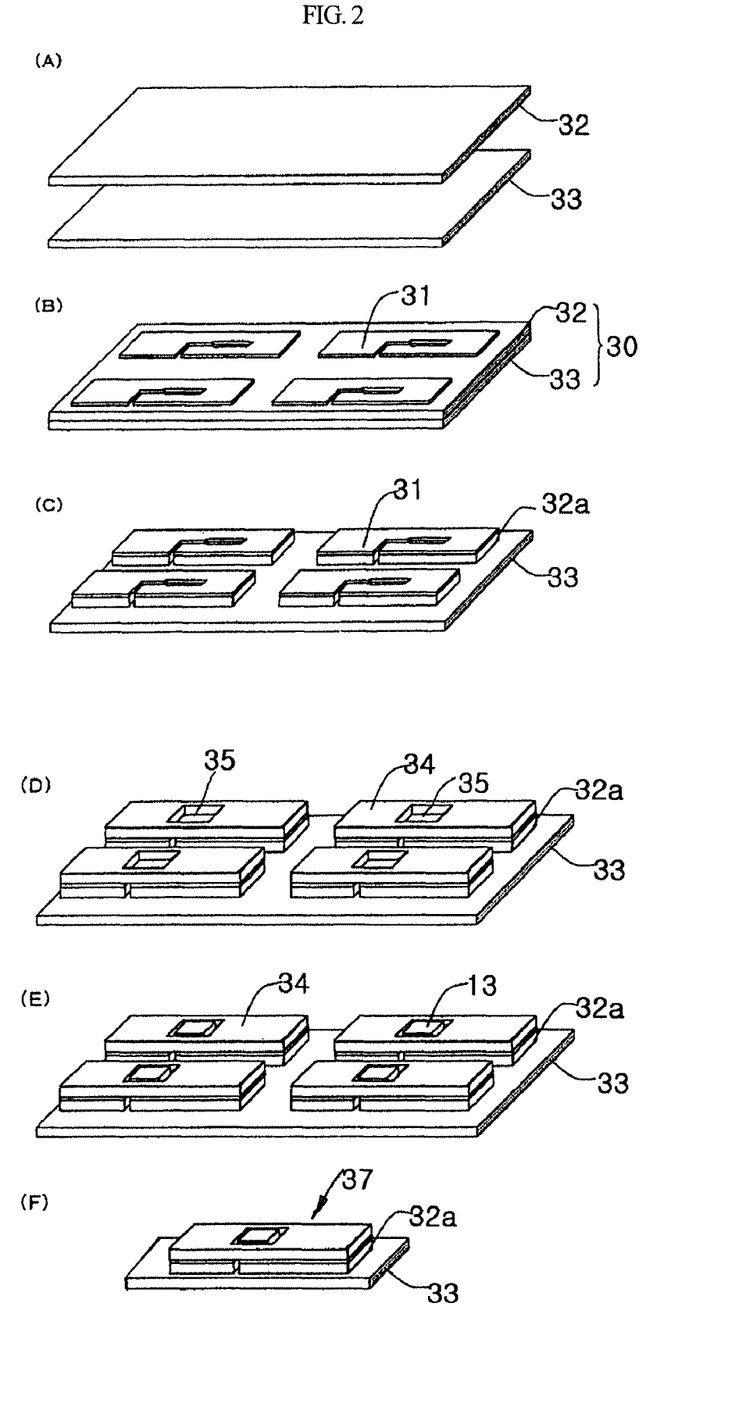
FIG. 2 is a diagram showing a process of manufacturing a conventional paper RFID card.
Figure 3:
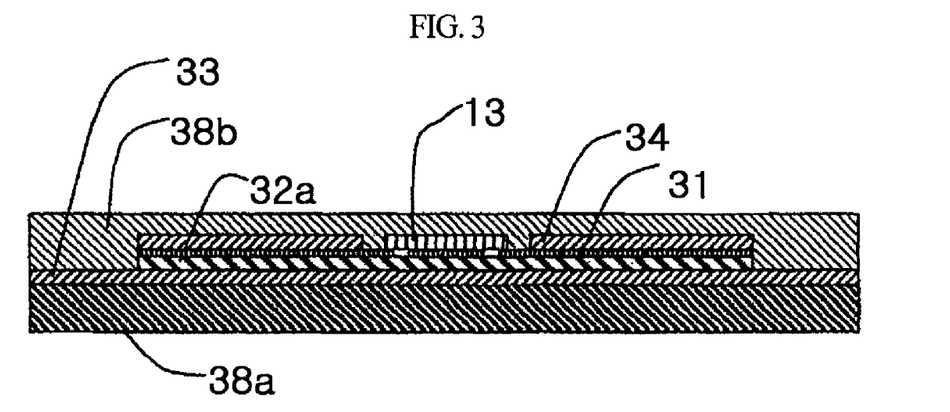
FIG. 3 is a sectional view of the paper RFID card achieved through the process shown in FIG. 2.

That is, FIG. 2 is a diagram showing a process of manufacturing the conventional paper RFID card, and FIG. 3 is a sectional view of the paper RFID card completed through the process shown in FIG. 2. The paper RFID card is manufactured through a process of manufacturing a metallic foil laminate, a process of forming a resin layer, a process of manufacturing an antenna pattern, a process of attaching a protective tape, an ultrasonic mounting process, a process of forming a thread, and a paper making process.

First, in the process of manufacturing a metallic film laminate, a metallic foil laminate 30 is constructed by stacking an aluminum metallic foil 32 having a thickness of about 7 µm, used to form an antenna, on a polyester film 33 having a thickness of about 12 µm, configured to form a thread 37, as shown in FIG. 2(A).

In the process of forming a resin layer, a resin layer 31 having a thickness ranging from 1 to 6 µm is formed on the surface of the aluminum metallic foil 32 of the metallic foil laminate 30 in the form of an antenna pattern, as shown in FIG. 2(B). This resin layer 31 is made using material that functions as a resist when the aluminum metallic foil 32 is processed through etching in the subsequent process.

In the process of manufacturing an antenna pattern, an antenna 32a is formed by eliminating portions of the aluminum metallic foil 32 exposed outside the resist of the antenna pattern of the resin layer 31 through etching, as shown in FIG. 2(C).

In the protective member attachment process, a protective member 34, which is a polyester film capable of withstanding high roll load in the following paper making process and having stiffness higher than a paper layer, and which is provided with openings 35, is fixedly adhered to the antenna 32a and the resin layer 31 using an adhesive, as shown in FIG. 2(D).

In the ultrasonic mounting process, an RFID chip 13 is inserted and pressed into each of the openings 35 formed above the antenna 32a and the resin layer 31, and lateral vibrations are applied to the top surface of the RFID chip 13, so that the metallic bump of the RFID chip 13 removes the resin layer 31 and comes into contact with the antenna 32a, as shown in FIG. 2(E).

In the process of forming the thread 37, RFID threads 37 are formed by cutting the RFID chip 13, the protective member 34, the antenna 32a, and the polyester film 33, which are stacked one on top of another, into individual units, as shown in FIG. 2(F).

In the paper making process, the manufacture of a paper-type RFID tag is completed by disposing an RFID thread 37, formed by stacking the protective member 34, the antenna 32a and the polyester film 33 one on top of another, between first and second paper layers 38a and 38b, and finally heating and pressing the RFID thread 37 and the first and second paper layers 38a and 38b, as shown in FIG. 3.

In the above-described Korean Unexamined Patent No. 2005-79621, the process of manufacturing the RFID thread 37, formed by stacking the RFID chip 13, the protective member 34, the antenna 32a and the polyester film 33 one on top of another, is excessively complicated. Furthermore, adhering is performed through heating and pressing after the RFID thread 37 is disposed between the first and second paper layers 38a and 38b. However, since the first and second paper layers 38a and 38b have low strength and are vulnerable to humidity, they are easily deformed, so synthetic resin, such as the material of the polyester film (including the protective member), is used to increase the strength thereof, with the result that the problem of air contamination at the time of discarding through incineration still remains.

Furthermore, since the first and second paper layers 38a and 38b are vulnerable to humidity, they are easily peeled from the RFID thread 37 in the case where the paper RFID card falls into water or gets wet in the rain, so that it has many problems related to being put to practical use.

DISCLOSURE

Technical Problem

Accordingly, the present invention has been made keeping in mind the above problems occurring in the prior art, and an object of the present invention is to provide an RFID card and a method of manufacturing the RFID card, in which the RFID card is manufactured in such a way that the typical sheets of the RFID card are made of Korean paper having excellent toughness, excellent strength and an excellent shock absorbing effect, a loop antenna is implemented by screen-printing it on the Korean paper, and waterproofing is performed to prevent the permeation of water, so that air pollution can be prevented because environmental hormones, toxic to human bodies, are not discharged at all when the lifespan of the RFID card expires and the RFID card is consequently incinerated, and the manufacturing cost and weight thereof can be considerably reduced.

Technical Solution

The present invention provides an RFID card having a base sheet provided with a chip accommodation portion in which an RFID chip, configured to have a traffic card function, to store information, such as an amount of money, and to be connected to a loop antenna, is accommodated, protective sheets stacked on top and bottom surfaces of the base sheet to protect the RFID chip, and transparent film sheets stacked on outside surfaces of the protective sheets and provided with advertisements, wherein the base sheet is made of strawboard that is manufactured by breaking bark of paper mulberry and straw into pieces and mixing them together; the protective sheet is made of oiled floor paper that is manufactured by coating Korean paper, formed by breaking bark of paper mulberry into pieces and converting them into paper, with perilla oil; the transparent film sheets are made of Chinese drawing paper that is manufactured using paper mulberry, on which screen printing can be performed, as raw material; and the loop antenna is printed on the strawboard, that is, the base sheet, in conductive ink, and is connected to the RFID chip.

In addition, the present invention provides a method of manufacturing an RFID card using Korean paper, the RFID card having a base sheet provided with a chip accommodation portion, in which an RFID chip, configured to have a traffic card function, to store information, such as an amount of money, and to be connected to a loop antenna, is accommodated, protective sheets stacked on top and bottom surfaces of the base sheet to protect the RFID chip, and transparent film sheets stacked on outside surfaces of the protective sheets and provided with advertisements, comprising a Korean paper sheet provision step of cutting strawboard manufactured by breaking paper mulberry and straw into pieces and mixing them together, sheets of oiled floor paper manufactured by coating Korean paper, made using paper mulberry as raw material, with perilla oil, and sheets of Chinese drawing paper configured to allow screen printing to be performed thereon and made using wisteria as raw material to a length and width greater than those of a typical RFID card, and forming the chip accommodation portion in one side of the strawboard; an advertisement printing step of, after the Korean paper sheet provision step, forming advertisements by printing the advertisements on one surface of each of the Chinese drawing paper sheets, used as the transparent film sheets, in oil ink; an RFID tag installation step of, after the advertisement printing step, printing an loop antenna on a top surface of the strawboard, used as the base sheet, in conductive ink, inserting the RFID chip into the chip accommodation portion, and connecting the loop antenna with the RFID chip; an adhesive application step of, after the RFID tag installation step, applying oil adhesive to both surfaces of the strawboard, both surfaces of the oiled floor paper sheets, and remaining surfaces of the Chinese drawing paper sheets, on which the advertisements are not printed; a stacking and pressing step of, after the adhesive application step, sequentially stacking the oiled floor paper sheet, used as the protective sheet, and the Chinese drawing paper sheet, used as the transparent film sheet, on each of top and bottom surfaces of the strawboard, used as the base sheet, and pressing the sheets using a pressing body having a weight ranging from 0.3 to 1 Kg for 7-8 hours; a cutting step of, after the stacking and pressing step, forming a standard-size Korean paper RFID card by cutting away unnecessary portions; and a side waterproofing step of, after the cutting step, coating sides of the Korean paper RFID card with perilla oil and drying the Korean paper RFID card at normal temperature.

ADVANTAGEOUS EFFECTS

The present invention has advantages in that Korean paper is used when RFID cards are manufactured, so that environmental contaminants are prevented from being discharged when the life spans of the RFID cards expire and thus are discarded through incineration, with the result that the RFID cards are made to be environmentally friendly and, at the same time, the manufacturing cost thereof can be considerably reduced.

DESCRIPTION OF REFERENCE NUMERALS OF PRINCIPAL ELEMENTS IN THE DRAWINGS

| 10: | RFID card |
| 11: | base sheet |
| 11: | chip accommodation portion |
| 12: | loop antenna |
| 13: | RFID chip |
| 14, 15: | protective sheet |
| 17, 18: | transparent film sheet |
| 11a, 14a, 15a, 17a, 18a: | through hole |
| 21: | pressing frame |
| 22: | holding pin |
| 23: | pressing body |

BEST MODE

A method of manufacturing an RFID card using Korean paper according to the present invention is described in detail below.

First, the types of Korean paper used in the present invention are described below.

Generally, Korean paper is paper that is manufactured using the fibers of the bark of a paper mulberry tree as raw material through a unique Korean manufacturing method, and is classified into various types according to the raw material and the purpose of use.

Korean paper is classified, according to the raw material, into straw paper manufactured using oat straw as raw material, wisteria paper manufactured using wisteria as raw material, hempen stalk paper manufactured by breaking the stalk of hemp plants into pieces and mixing the main material with them, strawboard manufactured by breaking paper mulberry bark and straw into pieces and mixing them with each other, white powder paper made of white paper to which white powder is applied, mulberry paper manufactured by mixing main material with the bark of a mulberry tree, pine tree leaf paper manufactured by breaking pine tree leaves into pieces and mixing main material with them, pine tree endothelium paper manufactured by mixing the bark of a paper mulberry tree with the endothelium of a pine tree, willow paper manufactured by breaking willow into pieces and mixing the main material with them, willow leaf paper manufactured by mixing the main material with willow leaves, solid moss paper manufactured by mixing the main material with seaweed, like hair, moss paper manufactured by mixing the main material with moss, and jute paper manufactured by mixing the main material with jute.

Furthermore, Korean paper is classified, according to the purpose of use, into letter paper, that is, rolled letter paper used to write letters, armor paper inserted into the winter garments of soldiers, instead of cotton, official appointment paper used when writs of appointments are prepared by a government or government offices, wallpaper used for papering walls, backing paper attached to another piece of paper, such as a piece of Chinese drawing paper, present paper used for presents, memorial paper used to send up a memorial to the throne, fan paper used to make fans, prayer paper to be burnt after praying to God, poetry paper used to write poems, test paper used to take the civil service examination, oiled floor paper used to cover floors, bill paper used to make bills, genealogy paper used to make genealogies, oil paper used to make parasols, sliding screen paper used to cover the gaps of doors, book paper used to make books, cover paper used to make the covers of books, coarse paper, that is, paper mulberry paper having inferior quality, printing pattern paper used to draw printing patterns, Chinese drawing paper used to draw pictures or characters, and matrimonial vow paper used to write matrimonial vows.

Some types of paper are selected from among various types of Korean paper, classified according to raw material or the purpose of use, and an RFID card is manufactured using the selected types of Korean paper. In particular, a base sheet 11, on which an RFID chip 13 and an antenna 12 are formed, is made of strawboard, on which the loop antenna 12 can be screen-printed in conductive ink, and which is manufactured by breaking straw into pieces and mixing the main material with them, thereby being capable of maintaining a predetermined amount of strength, protective sheets 14 and 15, which are disposed on both sides of the strawboard base sheet 11 and protect the RFID chip 13, are made of oiled floor paper that is used to cover floors, thereby protecting the RFID chip 13 and the antenna 12 through the absorption and buffering of impact applied from the outside, and transparent film sheets 17 and 18, which are respectively placed on the outside surfaces of the protective sheets 14 and 15, are made of Chinese drawing paper, which is made of wisteria so as to enable screen printing to be performed thereon to form advertisements.

The oiled floor paper is manufactured by breaking the bark of a paper mulberry tree into pieces, making paper using them, and coating the paper with perilla oil, and is used to enhance strength and to prevent the RFID chip 13 from operating erroneously because the oiled floor paper can adjust to the current humidity.

The strawboard is manufactured by breaking the bark of a paper mulberry tree and straw into pieces and mixing them with each other, and is used to increase the strength of the RFID card. The Chinese drawing paper is paper that has the original purpose of being used to draw pictures or write characters. In the present invention, it is used to allow oil printing ink, used to form an advertisement, to soak therethrough so as to print the card.

Furthermore, a typical RFID card has a thickness of about 0.8 mm, which is determined according to international standards. Furthermore, in the case where characters or photos are transferred in a card issuing machine, the size of the card slot of the card issuing machine ranges from about 0.8 to 0.9 mm, the thickness of the strawboard, the oiled floor paper, and the Chinese drawing paper is 0.1~0.4 mm. If necessary, a plurality of pieces of paper, which are stacked one on top of another, may be used to enhance strength.

In the present invention, the strawboard, the oiled floor paper, and the Chinese drawing paper are collectively defined as 'Korean paper'.

A process of manufacturing an RFID card using Korean paper sheets as the respective sheets, as described above, is described in detail with reference to FIGS. 4 to 6 below.

Figure 4:
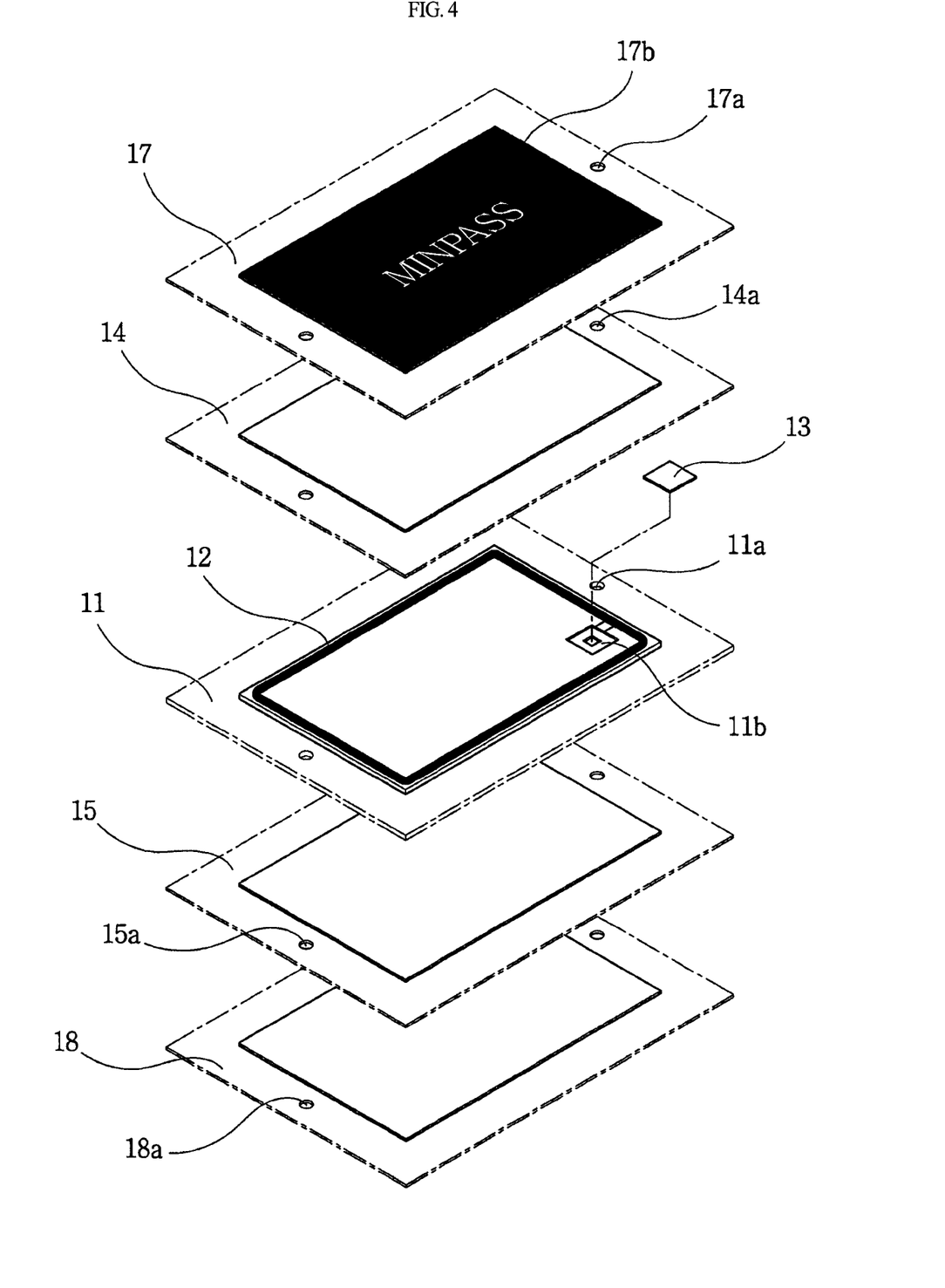
FIG. 4 is an exploded perspective view showing a Korean paper provision step in a process of manufacturing an RFID card using Korean paper according to the present invention.
Figure 5:
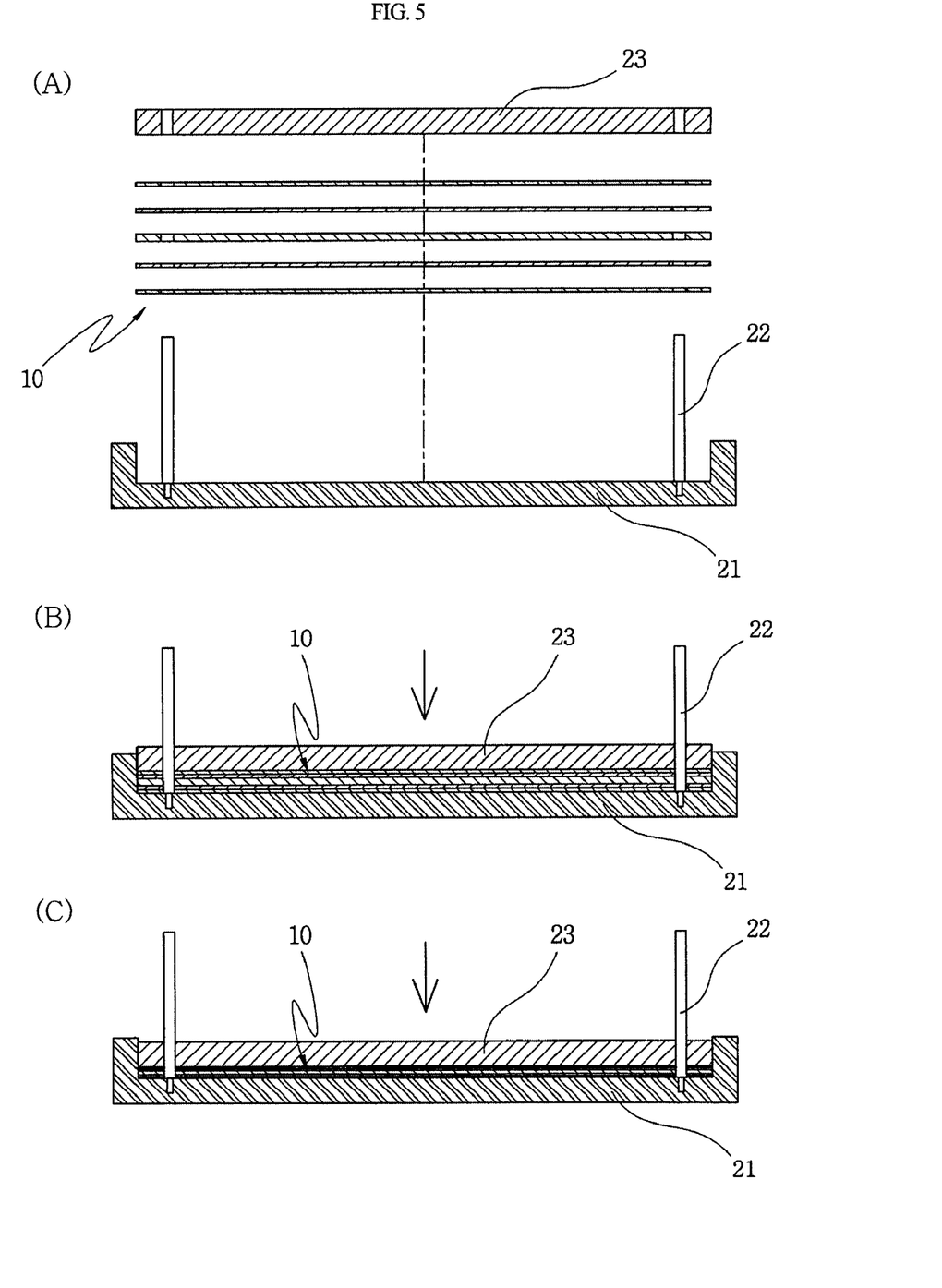
FIGS. 5 and 6 are sectional views showing a manufacturing process that follows the Korean paper provision step of FIG. 4.
Figure 6:
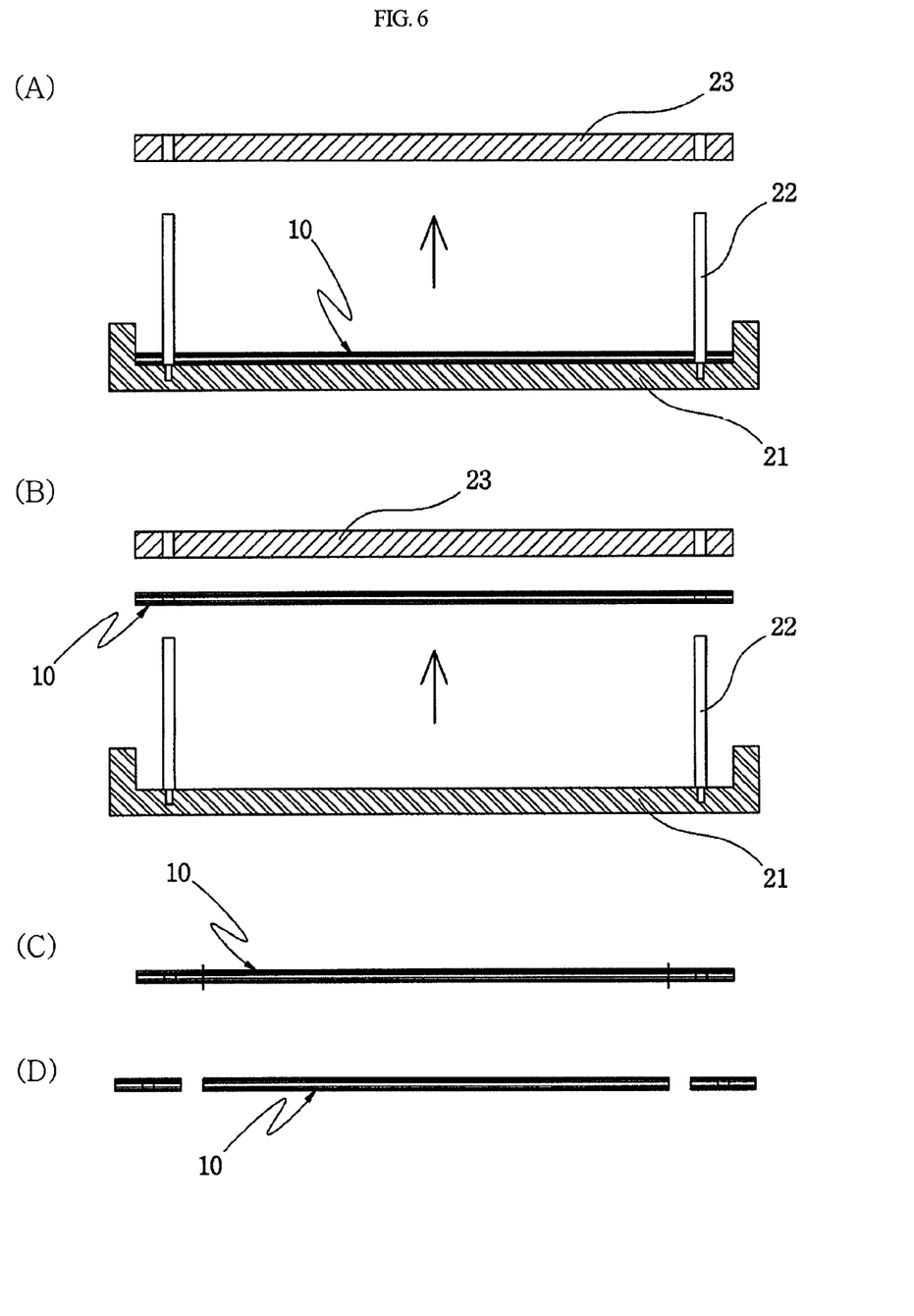
Figure 7:
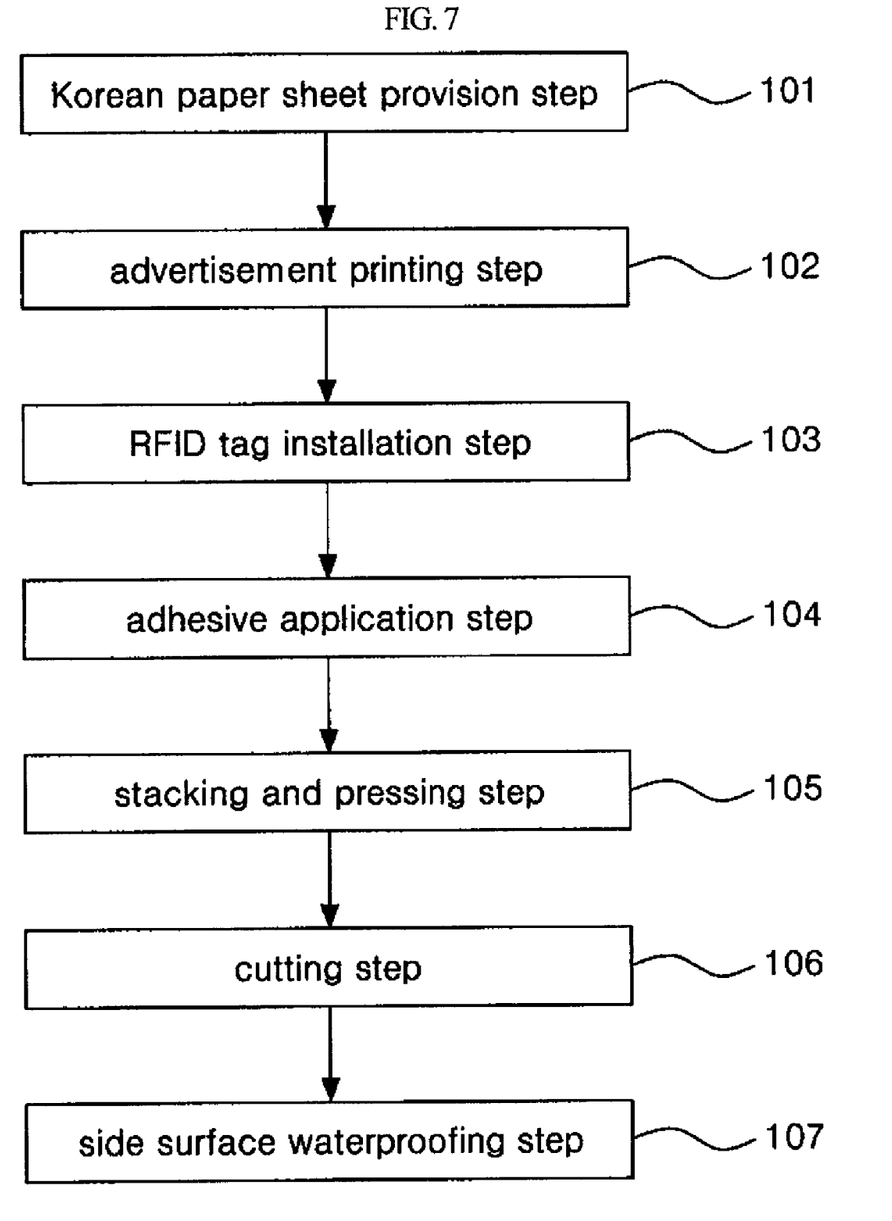
FIG. 7 is a flowchart showing a process of manufacturing an RFID card using Korean paper according to the present invention.

FIG. 4 is an exploded perspective view showing preparing Korean paper in the process of manufacturing an RFID card using Korean paper according to the present invention, FIGS. 5 and 6 are sectional views showing the manufacturing steps after preparing the Korean paper of FIG. 4, and FIG. 7 is a flowchart showing the process of manufacturing an RFID card using Korean paper according to the present invention.

First, as shown in FIG. 4, an Korean paper sheet preparing step 101 of preparing the Korean paper sheets through the cutting of strawboard used as the base sheet 11, oiled floor paper sheets used as the protective sheets 14 and 15, and Chinese drawing paper sheets used as the transparent film sheets 17 and 18 to a length and width greater than those of a typical RFID card, forming through holes 11a, 14a, 15a, 17a or 18a in both sides of each of the sheets, and forming a chip accommodation portion 11b, in which the RFID chip 13a is accommodated, in one side of the strawboard, used as the base sheet 11, is performed through press work.

After the Korean paper sheet preparing step has been performed, an advertisement printing step 102 of forming an advertisement 17a by screen-printing the advertisement 17a on one surface of each of the sheets of Chinese drawing paper, used as the transparent film sheets 17 and 18, in oil ink is performed, in which case oil ink must be used when the advertisement 17a is formed. The reason for this is to prevent a phenomenon in which moisture permeates the Chinese paper, used as the transparent film sheets 17 and 18. The type of oil ink is not limited.

After the advertisement printing step 102 has been performed, an RFID tag installation step 103 of screen-printing the loop antenna 12 on the top surface of the strawboard, used as the base sheet 11, in conductive ink, inserting the RFID chip 13 into the chip accommodation portion 11b, and connecting the RFID chip 13 to the printed loop antenna 12 is performed.

In this case, when the RFID chip 13 is inserted into the chip accommodation portion 11b, the top surface of the RFID chip 13 is even with the top surface of the strawboard, used as the base sheet 11, so that no influence is exerted by the following bonding step.

In this case, the conductive ink, used to print and form the loop antenna 12, is formed by dispersing conductive fillers throughout a vehicle, refers to ink, the hardened membrane of which, formed after printing, exhibits conductivity, includes metal (silver, gold, platinum, palladium, copper and nickel), metal oxide (ruthenium oxide), amorphous carbon powder, graphite, and carbon fibers as main ingredients. Such conductive ink is widely known already.

Accordingly, since the loop antenna 12 is printed and formed in conductive ink, the loop antenna 12 is completely incinerated along with the strawboard used as the base sheet 11 at the time of incineration, so that no remnants remain.

After the RFID tag installation step 103 has been completed, the adhesive coating step 104 of coating both surfaces of the strawboard used as the base sheet 11, both surfaces of each of the oiled floor paper sheets used as the protective sheets 14 and 15, and the advertisement-free surface of each of the Chinese drawing paper sheets used as the transparent film sheets 17 and 18 with an oil adhesive is performed.

In this case, an oil adhesive having a hydrophilic property must be used as the adhesive. The reason for this is to prevent water from permeating between the strawboard used as the base sheet 11, the oiled floor paper sheets used as the protective sheets 14 and 15, and the Chinese drawing paper sheets used as the transparent film sheets 17 and 18, thereby maintaining waterproofness. The type of adhesive is not limited.

After the adhesive coating step 104 has been completed, an RFID card 10 using Korean paper is manufactured by performing a stacking and pressing step 105 of stacking the strawboard, the oiled floor paper and the Chinese drawing paper one on top of another in such a way as to pass the holding pins 22 of a pressing frame 21 through the through holes 11a, 14a, 15a, 17a and 18a in both sides of the pieces of paper, as shown in FIG. 5(A), and pressing a pressing body 23 having a weight ranging from 0.3 to 1 Kg on the pieces of paper for 7-8 hours, as shown in FIGS. 5(B) and 5(C), thereby pressing the strawboard used as the base sheet 11, the oiled floor paper used as the protective sheets 14 and 15, and the Chinese drawing paper used as the transparent film sheets 17 and 18 using the weight of the pressing body 23.

In this case, if the pressing body 23 has a weight equal to or heavier than 0.3 Kg, the load, pressing the sheets, is low, so that air spaces are formed between the respective sheets, and thus contact failure may occur. If the pressing body 23 has a weight equal to or heavier than 1 Kg, the RFID chip 13 may be damaged. Accordingly, it is preferable to press the sheets using a pressing body 23 having a weight ranging from 0.3 to 1 Kg. Further, only after pressing has been performed for 7-8 hours can the adhesive be sufficiently dried and the sheets be firmly adhered to each other.

After the stacking and pressing step 105 has been completed, a cutting step 106 of separating the RFID card 10, manufactured using Korean paper, from the pressing frame 21, as shown in FIGS. 6(A) and 6(B), and cutting away unnecessary portions, as shown in FIGS. 6(C) and 6(D), is performed, thereby forming a standard-size Korean paper RFID card 10 having a predetermined size.

When, after the cutting step 106, a side waterproofing step 107 of coating the sides of the RFID card 10, made of Korean paper and cut at the edges thereof, with perilla oil or applying perilla oil to the RFID card 10, using a paint brush or a sprayer, is performed, thereby causing the perilla oil to sufficiently soak into the strawboard, the oiled floor paper, and the Chinese drawing paper, and then performing drying at normal temperature. Accordingly, water or moisture is prevented from soaking into the side of the RFID card 10 due to waterproofing, attributable to the perilla oil coating, even if the water or moisture enters through the side of the RFID card 10, thereby completing the manufacture of the RFID card using Korean paper according to the present invention.

The RFID card using Korean paper according to the present invention, which is manufactured through the above-described process, has advantages in that, when the lifespan of the RFID card expires and thus the card is incinerated, the loop antenna 12, printed in oil ink as well as strawboard, the oiled floor paper, and the Chinese drawing paper configured to form the base sheet 11, the protective sheets 14 and 15, and transparent film sheets 17 and 18 are completely burnt into ash, so that no environmental hormones, toxic to human bodies, are generated. Furthermore, the manufacturing process thereof is simple, and the material of the RFID card 10 is inexpensive, so that the manufacturing cost thereof can be reduced. The weight of the RFID card 10 can be considerably reduced, so that the RFID card is convenient to carry.

INDUSTRIAL APPLICABILITY

As described above, according to the present invention, the RFID card is manufactured in such a way that the typical sheets of the RFID card are made of Korean paper having excellent toughness, excellent strength and an excellent shock absorbing effect, the loop antenna is implemented by screen-printing it on the Korean paper, and waterproofing is performed to prevent the permeation of water. As a result, air pollution can be prevented because no environmental hormones, toxic to human bodies, are discharged when the lifespan of the RFID card expires, and thus the RFID card is incinerated, and the manufacturing cost and weight thereof can be considerably reduced.

The invention claimed is:

1. A Radio Frequency Identification (RFID) card having a base sheet provided with a chip accommodation portion in which an RFID chip, configured to have a traffic card function, to store information, such as an amount of money, and to be connected to a loop antenna, is accommodated, protective sheets stacked on top and bottom surfaces of the base sheet to protect the RFID chip, and transparent film sheets stacked on outside surfaces of the protective sheets and provided with advertisements, wherein:
   the base sheet is made of strawboard that is manufactured by breaking bark of a paper mulberry tree and straw into pieces and mixing them together;
   the protective sheet is made of oiled floor paper that is manufactured by coating Korean paper, formed by breaking bark of paper mulberry into pieces and converting them into paper, with perilla oil;
   the transparent film sheets are made of Chinese drawing paper that is manufactured using paper mulberry, on which screen printing can be performed, as raw material; and
   the loop antenna is printed on the strawboard, that is, the base sheet, in conductive ink, and is connected to the RFID chip.

2. The RFID card as set forth in claim 1, wherein the strawboard, the oiled floor paper, and the Chinese drawing paper have thicknesses ranging from 0.1 to 0.4 mm.

3. A method of manufacturing an RFID card using Korean paper, the RFID card having a base sheet provided with a chip accommodation portion, in which an RFID chip, configured to have a traffic card function, to store information, such as an amount of money, and to be connected to a loop antenna, is accommodated, protective sheets stacked on top and bottom surfaces of the base sheet to protect the RFID chip, and transparent film sheets stacked on outside surfaces of the protective sheets and provided with advertisements, comprising:
   a Korean paper sheet provision step of cutting strawboard manufactured by breaking paper mulberry and straw into pieces and mixing them together, sheets of oiled floor paper manufactured by coating Korean paper, made using paper mulberry as raw material, with perilla oil, and sheets of Chinese drawing paper configured to allow screen printing to be performed thereon and made using wisteria as raw material to a length and width greater than those of a typical RFID card, and forming the chip accommodation portion in one side of the strawboard;
   an advertisement printing step of, after the Korean paper sheet provision step, forming advertisements by printing the advertisements on one surface of each of the Chinese drawing paper sheets, used as the transparent film sheets, in oil ink;
   an RFID tag installation step of, after the advertisement printing step, printing an loop antenna on a top surface of the strawboard, used as the base sheet, in conductive ink, inserting the RFID chip into the chip accommodation portion, and connecting the loop antenna with the RFID chip;
   an adhesive application step of, after the RFID tag installation step, applying oil adhesive to both surfaces of the strawboard, both surfaces of the oiled floor paper sheets, and remaining surfaces of the Chinese drawing paper sheets, on which the advertisements are not printed;
   a stacking and pressing step of, after the adhesive application step, sequentially stacking the oiled floor paper sheet, used as the protective sheet, and the Chinese drawing paper sheet, used as the transparent film sheet, on each of top and bottom surfaces of the strawboard, used as the base sheet, and pressing the sheets using a pressing body having a weight ranging from 0.3 to 1 Kg for 7-8 hours;
   a cutting step of, after the stacking and pressing step, forming a standard-size Korean paper RFID card by cutting away unnecessary portions; and
   a side waterproofing step of, after the cutting step, coating sides of the Korean paper RFID card with perilla oil and drying the Korean paper RFID card at normal temperature.

* * * * *